Oct. 9, 1945.   G. H. KAEMMERLING   2,386,472
DEFLECTION MEASURING INSTRUMENT
Filed July 5, 1943

Gustav H. Kaemmerling
Inventor
By
Attorney

Patented Oct. 9, 1945

2,386,472

UNITED STATES PATENT OFFICE 2,386,472

DEFLECTION MEASURING INSTRUMENT

Gustav H. Kaemmerling, Erie, Pa., assignor to Lord Manufacturing Company, Erie, Pa., a corporation of Pennsylvania Application July 5, 1943, Serial No. 493,554

9 Claims. (Cl. 73—100)

The instrument herein described illustrates a practical embodiment of my present invention of means for testing the deflection of various articles, the resistance to which it is desirable to ascertain by the measurement of the lateral distortion of the article created by the application of a known force. To this end my invention embodies a holder for the article to be tested, an indicator capable of being set to zero reading against one side of the article and an arrangement of parts including a scale bar having an adjustable weight and an actuator or plunger operated thereby by which pressure can be applied to the other face of the article.

A further object of my invention is to provide a simple mechanical structure for testing check pieces of vibration absorption devices, or mountings, especially those constructed partly or wholly of rubber, the load characteristics of which are determined by such factors as the diameter of the rubber, its cross sectional design including the thickness of the body and also the composition of the rubber itself.

To these and other ends my invention also consists in the further improvements and features hereinafter described in the accompanying specification and set forth in the appended claims.

In the drawing.

Similar reference characters in the several figures indicate similar parts.

Figure 1:
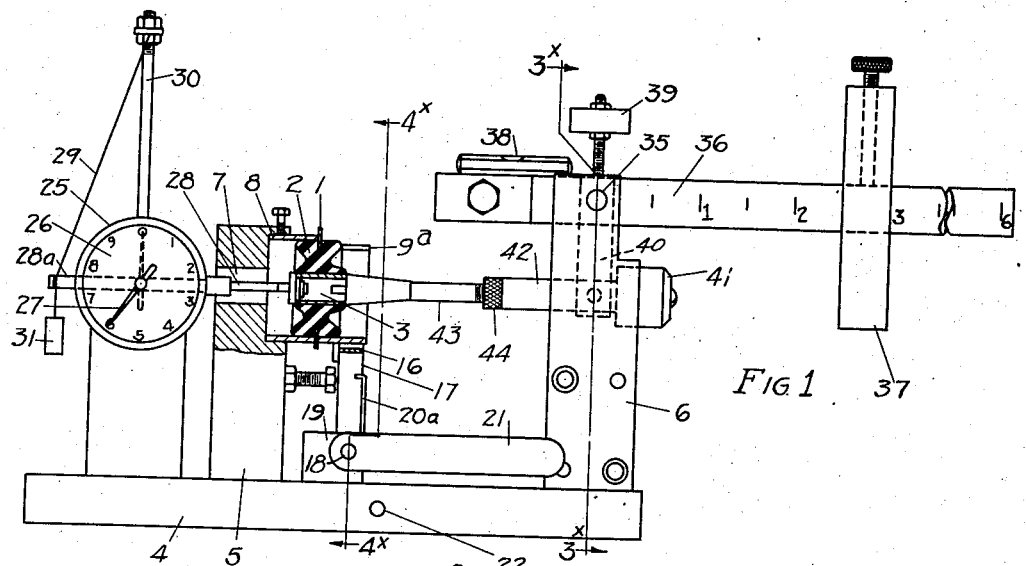
Figure 1 is a side view of a testing apparatus illustrating one embodiment of my invention, the check piece holder and the test piece therein being shown in section.

A machine constructed in accordance with my invention is adaptable to measuring deflections in a wide variety of devices but for the purpose of illustration and to simplify the description and illustration, I have shown its use in measuring the deflection or distortion of a vibration absorption mounting of the type illustrated in the patent granted to H. C. Lord et al. March 14, 1939, No. 2,150,282. This is a mounting comprising a plate indicated by 1 having an opening within which is a resilient center piece 2, of rubber or similar material bonded to the plate and having a central pin or tubular core 3, also bonded to the rubber.

In the commercial production of these vibration absorption mountings, they are made in a large number of sizes, so that the characteristics of the rubber portions vary in cross sectional shape from comparatively thin sections to those of considerable thickness to provide, for example, mountings for carrying light loads of from less than a pound to several hundred pounds each.

Like other products manufactured in quantities and sold for specific purposes, it is essential that specification standards be maintained and where these call for certain characteristics of the rubber, it is essential that the manufacturer maintains a check on the product at various stages during the manufacturing process and that he also test the completed articles, or a certain percentage of the same. To this end I have provided the present machine comprising a frame consisting of a base 4 carrying two alined pedestals 5 and 6. The former comprises the fixed member of a piece holder. This is provided at its upper end with an aperture 7 in the forward side of which is mounted a removable ring 8 of suitable diameter to receive the body 2 of a check piece or mounting and form a back stop for its plate 1.

The other part of the holder is movable and comprises a presser ring 9 adapted to engage the other side of the plate 1. The ring is carried on trunnions 15 detachably supported on the bifurcated ends 16 of a supporting arm 17 attached to a shaft 18 journaled in a boss 19 on the base 4. The rear end of this shaft carries a coil spring 20 one end of which is attached to the base 4 while the other 20a bears against the arm 17 and normally holds the ring 9 in position to grip the work piece. In order that the latter may be easily inserted in the holder and removed therefrom, the shaft 18 has a handle 21 which may be moved downwardly into engagement with a stop 22 to retract the ring 9 to the open position shown in Figure 2.

The ring 9 is provided with an opening 9a to provide clearance for the actuator, or plunger, as will be presently described. The arrangement of the parts shown is such that the work piece is held securely seated by sufficient spring pressure yet permits their being handled rapidly.

Figures 4, 5:
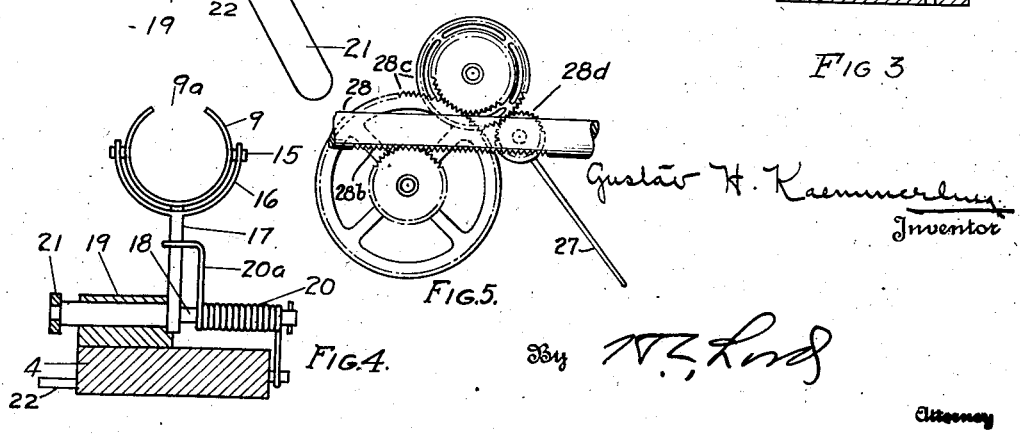
Figure 4 is a cross sectional view on the line 4x—4x of Figure 1, showing the presser ring of the work piece holder.
Figure 5 is a diagrammatic view of the gear train of the indicator employed for actuating its indicating needle.

At one side of the work piece holder there is mounted an indicating device comprising a casing 25 having a suitably graduated dial 26, a revolving index pointer or hand 27 and an impeller 28 for operating it, the driving connections between these last mentioned parts are shown in Figure 5 and comprise a rack 28$^b$ on the impeller 28, and a gear train 28$^c$ actuated thereby and imparting movement to the arbor of the index pointer which is indicated by 28$^d$. One feature of the indicator is that the indexed dial is carried on a bezel, rotatable on the indicator case, so that the zero marking "0" may be set to register with the initial setting of the hand 27, as determined by the starting position of the impeller 28, when the work piece is backed against the ring 8. This is a common feature on commercially available indicators. The indicating hand at the starting position, is shown in dotted lines in Figure 1. Another feature of the indicator is the simple and delicate adjustment used for holding the impeller against the work piece. This is done by projecting the outer end 28$^a$ of the impeller beyond the far side of the casing 25 where it is provided with an aperture through which a thread 29 extending downwardly at a small angle from a post 30 suspends a weight 31.

On the top of the other pedestal 6, in a plane somewhat above the axis of the test piece holder, I pivot at 35 a scale beam 36 having a graduated scale thereon whereby the operator may, by using weights 37 of different known values, determine by their position on the beam the pressure in pounds he is exerting through the beam connections on the work piece, or test sample, in its holder. The beam is also provided with a spirit level 38 and an adjustable counterweight 39.

The scale beam is constructed in the form of a bell crank lever, the other arm of which is indicated at 40 and carries at its lower end, a pivoted plunger which I designate the actuator for the test piece. This part is counterbalanced by a weight 41 so that when released it will assume the position shown in Figure 2. It comprises a rear section 42 and a forward part 43, the extremity of which engages the side of the work piece opposite to and in alinement with the indicator impeller 28 when in the operative position shown in Figure 1. The connection between the two parts 42 and 43 is telescoping, the latter being adjustable relatively to the former, as by a thread and nut 44 to enable the operator to bring the scale beam into a horizontal position at each setting, if required, as indicated by the spirit level 38. This last mentioned adjustment, as well as the adjustment of the indicator dial, I have found from practical experience is advantageous as it assures a means of compensating for inequalities in mountings which do not affect their operating characteristics and enables the operator to obtain greater accuracy in his testing procedure.

Figure 2:
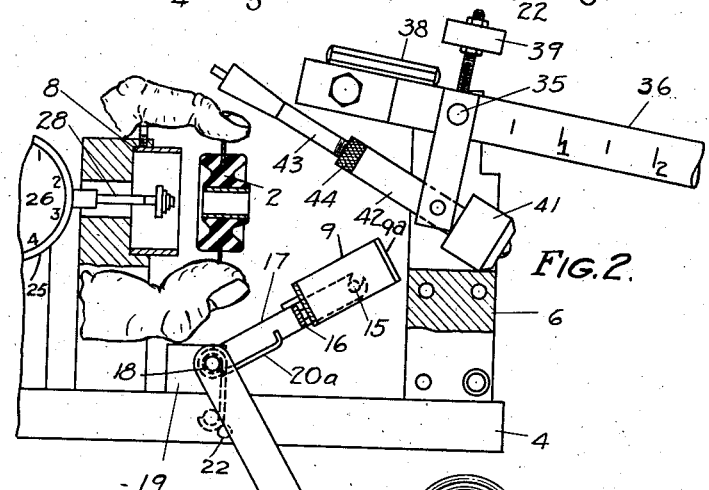
Figure 2 is an enlarged side view showing the test piece holder in open position and illustrating the insertion, or removal of, a test piece or mounting.
Figure 3:
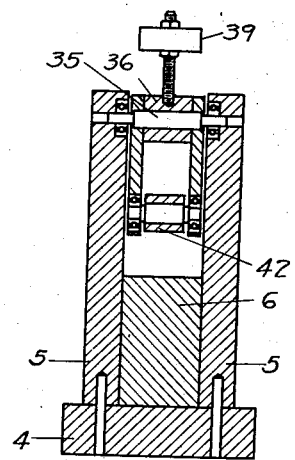
Figure 3 is a cross sectional view on the line 3x—3x of Figure 1.

In operation, the apparatus being in the position shown in Figure 2, a test piece is inserted, and the indicator dial adjusted to register zero against the position assumed by the indicator hand. The outer end of the scale beam is then elevated and the forward end 42 of the actuator depressed, passing through the slot 9$^a$ in the presser ring 9, and brought into contact with the face of the test piece. The operator knowing the intended operating characteristics of the test piece will have accordingly adjusted the weight on the scale beam so that by reading the deflection on the scale as indicated by the needle when the beam 36 is lowered he is able to judge the load carryng capacity of the work piece.

I claim as my invention:

1. The combination with a holder for a vibration absorption mounting comprising a fixed side piece and a second side piece movable toward and from the fixed side to engage and disengage a mounting, said side pieces having openings therein, a deflection instrument having an operating member engaging the center of the mounting within the fixed side of the holder, a member engaging the opposite side of the mounting, and a pivoted weighted scale beam operating the second mentioned member to deflect the mounting.

2. In a testing machine for indicating the deflection of a vibration absorption mounting, the combination with a holder for supporting such a mounting and a deflection indicator having an impeller resting against one side of the supported mounting, of an actuating member pressing against the opposite side of the latter, a pivoted weighted scale beam operating the actuating member to deflect the mounting, and means located between said member and beam for adjusting the latter into a horizontal position.

3. In a testing machine for indicating the deflection of a vibration absorption mounting, the combination with a holder for supporting such a mounting and a deflection indicator having an impeller resting against one side of the supported mounting, of a pivoted weighted scale beam, a member actuated thereby and arranged to engage the other side of the mounting to deflect it, said actuated member being pivotally mounted and counterbalanced to swing its free end into a position clear of the mounting in the holder when disengaged therefrom.

4. In a testing machine for indicating the deflection of a vibration absorption mounting, the combination with a holder for supporting such a mounting and a deflection indicator having an impelling member resting against the proximate side of the supported mounting, of a scale beam in the form of a bell crank lever carrying an adjustable weight on one arm and a plunger pivoted on its other arm in alinement with the mounting holder and adapted at its free extremity to rest against a mounting supported in said holder.

5. In a testing machine for indicating the deflection of a vibration absorption mounting, the combination with a holder for supporting such a mounting and a deflection indicator at one side of the holder having an impelling member adapted to rest against the adjacent side of a supported mounting, of a pivoted weighted scale beam carrying a lever arm, a plunger counterbalanced on the arm having a free end normally lying out of line with the holder and adjustable into engagement with the proximate side of a mounting in the holder when the scale beam is moved upwardly beyond a horizontal position.

6. In a testing machine for indicating the deflection of a vibration absorption mounting, the combination with a holder for supporting such a mounting, and a deflection indicator having an operating member resting against one side of a supported mounting, of a pivoted weighted scale beam carrying a lever arm, a plunger counterbalanced on the arm having a free end normally lying out of line with the holder and adapted to engage the adjacent side of a mounting in the holder, said plunger being adjustable in length to initially position the scale beam horizontally when the plunger is placed in contact with mounting.

7. In a testing machine for indicating the deflection of a vibration absorption mounting, the combination with a holder for supporting such a mounting and a deflection indicator having an impeller adapted to rest against one side of a supported mounting, of a weighted scale beam carrying a lever arm, a plunger pivoted on the arm having a forward free end adapted to engage a mounting on the holder and a counterbalanced rear end, and an adjustable element between the plunger and scale beam for setting the latter horizontally upon the initial engagement of the plunger with a mounting undergoing test.

8. In a machine for testing a vibration absorption device by determining its deflection in relation to its rated load carrying capacity, the combination with a holder for such an article comprising an apertured stationary backing, and a movable ring clamp, of a deflection measuring instrument having an impeller engaging an article on the stationary side of the holder, a plunger in line with the impeller engaging the other side of said article, a scale beam pivoted above the plunger having a lever arm carrying the plunger, and an adjustable element between the beam and plunger for leveling the former upon initial engagement of the latter with a mounting in the holder.

9. In a machine of the character described, the combination of a base, two pedestals thereon, one having an aperture therein and comprising the back of a holder for a mounting to be tested, a clamping ring movable toward and from it, and a scale beam pivoted on the other pedestal in a plane above the holder and having a downwardly extending arm, of a plunger pivoted on the arm having a free forward end adapted to extend through the clamping ring into engagement with one side of the mounting and a rear counterbalancing end, said plunger having an intermediate adjustable section for varying its length, and a deflection measuring scale having an impeller engaging the other side of a mounting in line with the plunger.

GUSTAV H. KAEMMERLING.